July 8, 1952     J. R. A. LESLIE ET AL     2,602,834
METHOD AND MEANS FOR LOCATING FAULTS IN TRANSMISSION LINES
Filed Dec. 6, 1948     2 SHEETS—SHEET 1
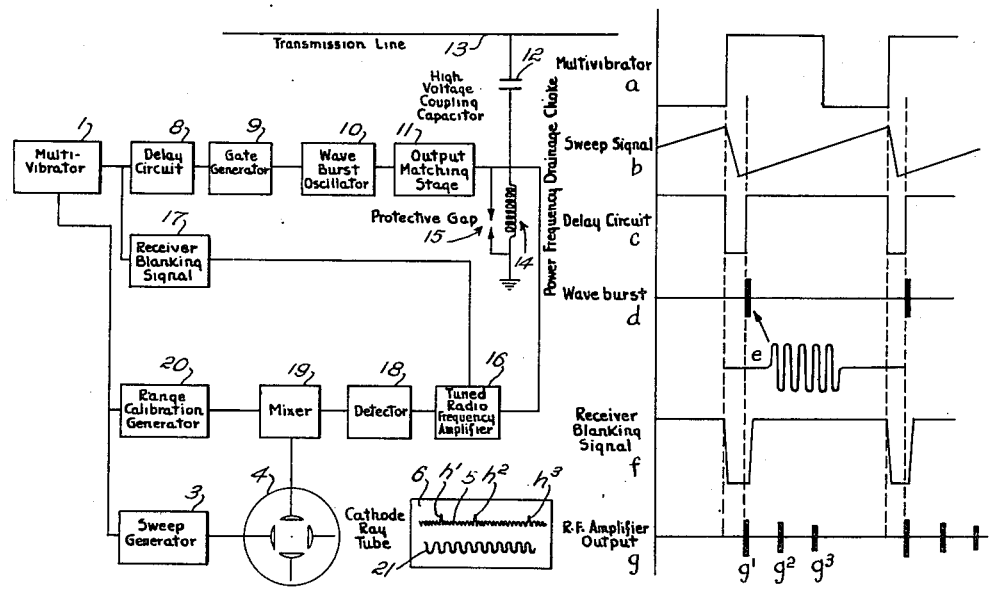
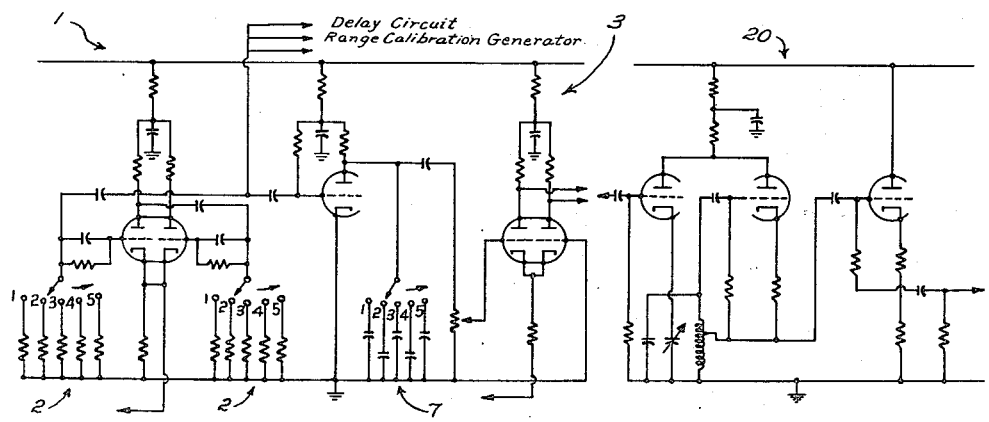
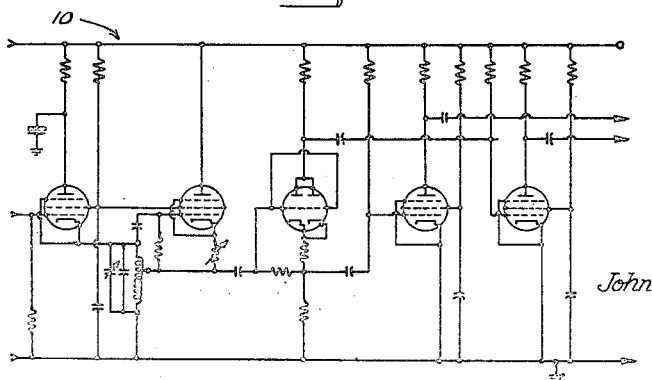
INVENTOR.
John R. A. Leslie and Keith H. Kidd
BY
Attorney.

INVENTOR.
John R. A. Leslie and Keith H. Kidd
BY Alex. E. MacRae
Attorney.

Patented July 8, 1952

2,602,834

UNITED STATES PATENT OFFICE 2,602,834

METHOD AND MEANS FOR LOCATING FAULTS IN TRANSMISSION LINES

John R. A. Leslie and Keith H. Kidd, Toronto, Ontario, Canada

Application December 6, 1948, Serial No. 63,656
In Canada December 9, 1947

2 Claims. (Cl. 175—183)

This invention relates to a method and means for inspecting and for locating faults in transmission lines, and particularly in high voltage transmission lines.

It has been proposed previously to locate faults, such as impedance irregularities, in transmission lines by applying a direct voltage pulse thereto and noting the characteristics and time interval involved in the reflected wave which may be displayed, for instance, on the screen of a cathode ray oscilloscope. To apply this type of pulse to the line under test, the equipment must be directly connected to the line. Moreover, when utilizing a direct voltage pulse, a broad band of frequencies is required and sharp tuning is impossible.

It is an object of the present invention to provide a transmission line fault locating method and means which may be utilized for detection of faults in a "live" or "dead" line with a minimum loss of time and which is subject to little interference from or to other associated equipment.

More specifically, an object is to provide a fault locating method including the steps of generating a high frequency, short duration, pulse or wave burst, applying the wave burst to a line under test, receiving and recording the characteristics and time of travel of the reflected wave burst.

Figure 5:
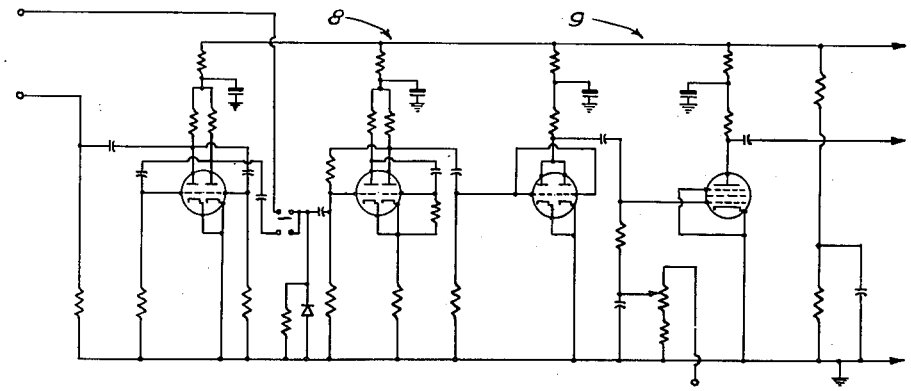
Figure 7:
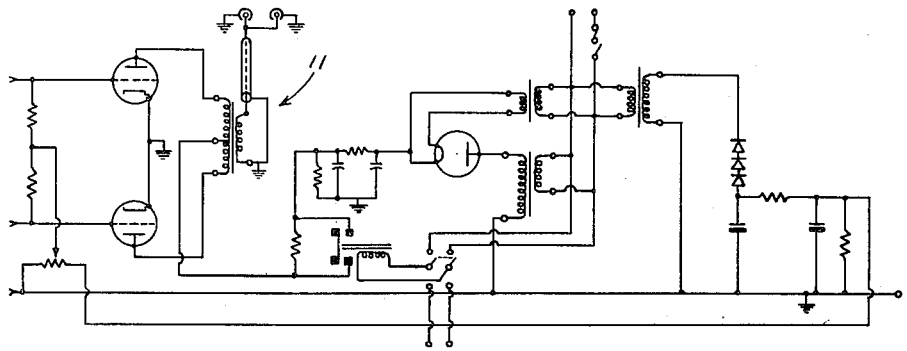
Figure 9:
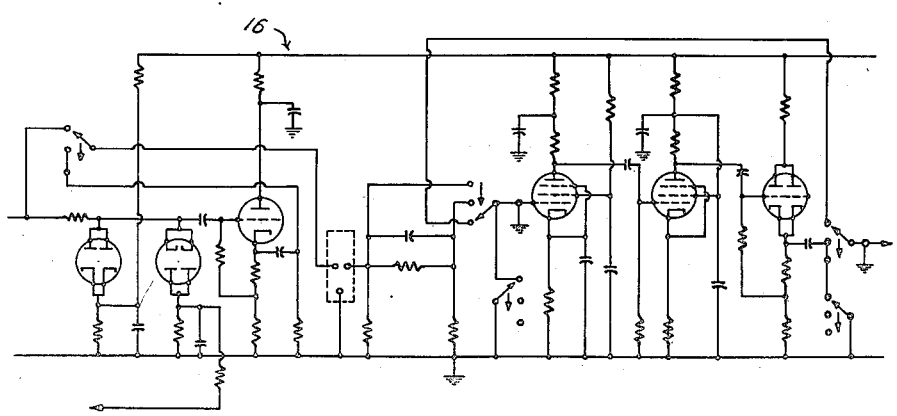

The invention will be described with reference to the accompanying drawing, in which Figure 1 is a block diagram of suitable equipment in accordance with the invention, Figure 2 is a diagram of wave shapes generated in various parts of the equipment, Figure 3 is a diagram of typical traces visible on an oscilloscope screen, Figure 4 is a schematic circuit diagram of the multivibrator and sweep generator indicated in Figure 1, Figure 5 is a schematic circuit diagram of the delay circuit and gate generator indicated in Figure 1, Figure 6 is a schematic circuit diagram of the wave burst oscillator indicated in Figure 1, Figure 7 is a schematic circuit diagram of the output matching stage indicated in Figure 1, Figure 8 is a schematic circuit diagram of the range calibration generator indicated in Figure 1, and Figure 9 is a schematic circuit diagram of the tuned radio frequency amplifier indicated in Figure 1.

Referring to the drawings, 1 is a multivibrator, which, as shown in Figure 4, is a conventional free running square wave generator. The generator runs at a rate which depends upon the mileage range under test since, in practical operation, the pulse repetition rate should vary with different lengths of lines to be tested. Typical ranges of lines to be tested are 25, 50, 100, 200 and 300 miles, and range switches 2 are provided having switch positions 1, 2, 3, 4, 5 corresponding respectively to the ranges mentioned. The output voltage waveform from the multivibrator is shown at $a$ in Figure 2, and is employed to control a conventional sweep generator 3. The sweep generator provides a linearly rising voltage wave $b$ which, as shown, is applied to the horizontal deflection plates of a cathode ray tube 4 to give a horizontal linear trace 5 on the screen 6 of the cathode ray tube. The sweep time of the trace is rendered proportional to the mileage range in use by means of a switch 7.

The multivibrator 1 also triggers a delay circuit 8, which, as shown in Figure 5, comprises a one shot multivibrator with a period short compared to that of the master multivibrator 1. The delay circuit produces a voltage waveform as indicated at $c$ in Figure 2.

The trailing edge of the delay circuit 8 is employed to trigger a gate generator 9, which has a circuit similar to that of the multivibrator 1 but which produces a step waveform of a duration equal to that of the desired waveburst referred to hereinafter.

The gate generator then gates a wave burst oscillator 10 which, as shown in Figure 6, is a conventional Hartley oscillator. The oscillator is adapted to generate repetitively very short duration wave bursts of carrier frequency or large amplitude. For instance, the wave burst may have a frequency of 250 kilocycles per second and a duration of about 10 microseconds. Generally, the wave burst should have a frequency of at least 50 kilocycles and a duration of not more than 50 microseconds. The oscillator is therefore tuned to the desired burst frequency, and it will be observed that it oscillates only during the short gating signal. The output waveform of the oscillator is indicated at $d$ and, on an expanded time scale, at $e$ (Figure 2). As shown, it consists of a short duration train of approximately sinusoidal oscillations.

The wave burst then passes via an output matching stage 11 and a high voltage coupling capacitor 12 to the transmission line 13, to which the device may be permanently coupled. The output matching stage serves to amplify the burst to the desired level, tunes it through the coupling capacitor to the line and provides an impedance match to the transmission line.

Safety devices in the form of a power frequency drainage choke 14 and a spark gap 15 are connected across the output terminals and, with the coupling capacitor 12, protect the operator and equipment against accidental surges when the transmission line is energized.

A tuned radio frequency amplifier 16 of conventional design receives and amplifies the reflected or echo wave generated by the bursts. Since the burst has a relatively narrow frequency band, the amplifier may be tuned to a narrow band centered on the burst frequency and may contain filter elements, as shown, to strongly attenuate extraneous carrier frequency signals on the same transmission line. Interference is thus substantially eliminated.

A receiver blanking signal 17, which may have a waveform as indicated at $f$, is applied to the receiver amplifier in order to render it relatively insensitive during the transmission of the outgoing wave burst. It will be appreciated that this receiver blanking signal may also be applied to the receiver in such manner as to vary the gain of the receiver amplifier with time. In such case the gain is very low (less than unity) during the transmission of the burst, then jumps to a considerably higher gain after the burst has been transmitted, and then continues to increase uniformly until the end of the sweep is reached. In this manner the returning echoes may be adjusted to constant amplitude regardless of distance travelled. The attenuation of the burst with distance along the line is compensated. The output from the amplifier consists of a number of bursts, indicated at $g$ in Figure 2. In the example shown, $g^1$ is the transmitted burst, $g^2$ is the echo from a fault, and $g^3$ the echo from the far end of the line.

This train of bursts preferably passes through a conventional detector stage 18 and then via a mixer 19 to the vertical deflection plates of the cathode ray tube, as shown. The detector output consists of the envelope of the train of bursts, as indicated at $h^1$, $h^2$ and $h^3$ in Figure 3 (and corresponding to the burst train $g^1$, $g^2$, $g^3$) and is intended to provide greater clarity than if the burst train itself were displayed on the cathode ray tube.

The multivibrator 1 also controls a range calibration generator 20, which, as shown, is a conventional pulsed Hartley oscillator. The latter produces a train of sinusoidal oscillations 21 on the cathode ray screen 11, such train serving as a time or range calibration scale.

The expression "wave burst," as employed in this specification and appended claims, is intended to mean a short duration train of approximately sinusoidal oscillations, such as is indicated, for example, at $e$ in Figure 2, and does not include pulses such as are conventionally known as unidirectional pulses of approximately "square" shape. An instance of such a train is one of five oscillations at a frequency of 250 kilocycles giving a burst duration of twenty microseconds.

The transmission line may be in service, i. e., "alive" or "dead" while the fault locator equipment is connected thereto. The cathode ray tube screen may be photographed at will, to obtain permanent records of the line conditions.

In operation, the wave bursts are applied to the transmission line for location of faults therein in the manner described. As is well known, if a wave travelling along a uniform transmission line comes to a sudden discontinuity, all or a portion of the pulse will be reflected back in the direction of the source. Major discontinuities, such as open and short circuits, result in substantially total reflection of the waves thus producing echoes having marked deflections in the trace. Minor discontinuities caused by transpositions, transformers, tower insulators and the like, result in partial reflection or echoes which produce minor deflections in the trace. That is to say, the echoes produce deflections in the cathode ray tube trace of an amplitude varying in accordance with the character of the discontinuity.

By measuring the polarity and magnitude of any particular echo, such as indicated at $h^3$, the nature of the impedance discontinuity in the line is determined. By measuring the line interval between the time of transmission of the pulse and the time of arrival of any echo, the distance to the source of the echo is determined, since the reflected wave returns toward the test terminals at the same known velocity as the outgoing wave.

Permanent coupling of the fault locating equipment to a line renders the same substantially immediately available for use, whereas equipment generating a direct voltage pulse must be connected to a "dead" line before it can be used. This feature greatly augments speed of operation which is of far-reaching significance on an important high voltage transmission line. Moreover, tests with the equipment of the present invention may be carried out on a "live" line, whereas the direct voltage pulse test can only be employed on a "dead" line. The use of photographic or other recording techniques make it possible to locate transient or short duration faults on high voltage lines, (such as occur from lightning flashover of transmission line insulators). Faults which do not cause a permanent outage but which last for only a fraction of a second can be located in this way.

The electrical energy of the wave burst utilized by the present invention is concentrated in a relatively narrower frequency spectrum than is the direct voltage pulse. Moreover, a particular frequency spectrum may be utilized by proper choice of the burst frequency. Thus, a frequency spectrum may be chosen in which there is a minimum of interference from or to other sources. More particularly, this means that the equipment may be used on a live line with a minimum of interference from the random electrical disturbances always produced on such a line. It may also be used on a transmission line on which carrier frequency equipment is also operating without causing interference to either type of equipment.

What is claimed is:

1. A method of locating faults in energized transmission lines which comprises repetitively generating a wave burst having a frequency of at least 50 kilocycles and a duration of not more than 50 microseconds, constantly applying said wave bursts to an energized line at a rate of repetition varying in accordance with the length of the line, and constantly receiving and recording echoes of said wave bursts from said line.

2. A device for locating faults in an energized transmission line which comprises an oscillator generating a wave burst having a frequency of at least 50 kilocycles and a duration of not more than 50 microseconds, a multivibrator controlling the operation of the oscillator to produce a succession of said wave bursts at a predetermined repetitive rate, means including a coupling capacitor connecting the oscillator to an energized transmission line, a tuned radio frequency amplifier connected to the line for receiving and amplifying the waves reflected from the line, and a cathode ray oscilloscope connected to the amplifier for recording the reflected waves.

JOHN R. A. LESLIE.
KEITH H. KIDD.

REFERENCES CITED

The following references are of record in the file of this patent:

UNITED STATES PATENTS

| Number | Name | Date |
|---|---|---|
| 2,253,975 | Guanella | Aug. 26, 1941 |
| 2,345,932 | Gould | Apr. 4, 1944 |
| 2,421,340 | Levy | May 27, 1947 |
| 2,423,082 | Busignies | July 1, 1947 |
| 2,428,424 | Landon | Oct. 7, 1947 |

OTHER REFERENCES

A. I. E. E. Technical Paper 47-86, Dec. 1946, Titled "Pulse Echo Measurements on Telephone & Television Facilities," Figs. 1 to 14.

Electrical World for Nov. 6, 1948, Pulse Radar Used to Locate Faults, pages 88 and 91.